United States Patent [19]

Roberts et al.

[11] 3,926,945

[45] Dec. 16, 1975

[54] 2,4-DICYANO BUTYLAMINO-SUBSTITUTED MONOAZO DYESTUFFS

[75] Inventors: Stiles M. Roberts, Loudonville; Lester N. Stanley, Delmar, both of N.Y.

[73] Assignee: GAF Corporation, New York, N.Y.

[22] Filed: May 16, 1972

[21] Appl. No.: 253,808

[52] U.S. Cl. ............... 260/205; 260/152; 260/154; 260/155; 260/156; 260/157; 260/158; 260/196; 260/206; 260/207; 260/207.1; 260/207.3; 260/207.5; 260/239 A; 260/239.3 R; 260/243 R; 260/243 B; 260/247.1 M; 260/247.1 R; 260/247.5 R; 260/281; 260/283 CN; 260/293.64; 260/293.65; 260/293.75; 260/293.77; 260/294.9; 260/307 B; 260/326 N; 260/326.5 FM; 260/326.5 J; 260/465 D; 260/465 E

[51] Int. Cl.² .................. C09B 29/06; C09B 29/08; C09B 29/26

[58] Field of Search ........... 260/196, 205, 206, 207, 260/207.1, 207.3, 207.5, 465 D, 465 E

[56] References Cited
UNITED STATES PATENTS

| | | | |
|---|---|---|---|
| 2,277,230 | 3/1942 | Heinrich | 260/205 |
| 2,941,992 | 6/1960 | Rhyner et al. | 260/205 |
| 2,971,953 | 2/1961 | Rhyner | 260/207.1 |
| 3,050,516 | 8/1962 | Merian | 260/205 |
| 3,359,256 | 12/1967 | Mueller et al. | 260/207 X |
| 3,444,137 | 5/1969 | Higginbottom et al. | 260/465 X |

FOREIGN PATENTS OR APPLICATIONS

| | | | |
|---|---|---|---|
| 7,016,415 | 5/1971 | Netherlands | 260/207 |
| 1,524,647 | 4/1968 | France | 260/207 |
| 1,097,360 | 1/1968 | United Kingdom | 260/465.5 R |

Primary Examiner—Charles F. Warren
Attorney, Agent, or Firm—Walter C. Kehm

[57] ABSTRACT

There are disclosed novel azo dyes which are useful as disperse and soluble dyes for synthetic fibers, particularly polyesters, silk, acetates, triacetates, nylons, polyacrylonitriles, polyurethanes, polyolefins and the like, which dyes may be described by the following general formula:

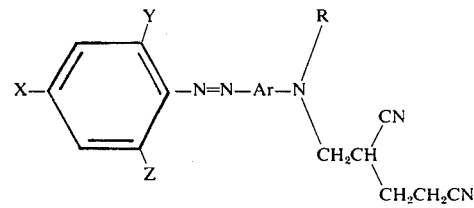

wherein X is a negative group, such as $NO_2$, lower alkyl sulfonyl, CN, $CF_3$, lower carboalkoxy, sulfonamide, mono- and di-lower alkyl sulfonamide, carboxamide and mono- and di-lower alkyl carboxamide, carbonyl- and sulfonyl-morpholide and piperidide; Y is hydrogen, chlorine, bromine, fluorine or the same as X; Z is hydrogen, chlorine, bromine, fluorine, cyano, $CF_3$, or lower carbalkoxy; Ar is a substituted or unsubstituted aryl radical attached to the azo group at the position para to the amino group and R is hydrogen, an alkyl radical or a substituted alkyl radical. When the R substituent contains an amino group there are also provided the corresponding quaternary ammonium salts of these compounds which are water-soluble, and the corresponding cyclic amides and imides.

4 Claims, No Drawings

2,4-DICYANO BUTYLAMINO-SUBSTITUTED MONOAZO DYESTUFFS

BACKGROUND OF THE INVENTION

1. Field of the Invention

This invention relates to novel azo dyes which have been found useful as disperse and soluble dyes for synthetic fibers to provide dyeings which have a high degree of sublimation fastness and methods for dyeing of such synthetic products.

2. Description of the Prior Art

With the introduction of synthetic fibers and synthetic textile materials, the demand for improved dyeing processes and products for use in dyeing these materials has substantially increased. The dyestuffs conventionally known to the art for dyeing natural products were generally found unsatisfactory because of lack of fastness to light or sublimation or for other reasons. Efforts to overcome the drawbacks of these conventional dyeing materials has resulted in the development of a large number of various types of dyestuffs which have been used in the dyeing of synthetic fibers.

A large body of art is concerned with azo dyestuffs and, particularly, for azo dyestuffs useful in dyeing of synthetic fibers. In none of the prior art, of which Applicants are aware are there disclosures of disperse and soluble dyes for dyeing synthetic fibers of the type described herein.

SUMMARY OF THE INVENTION

It is, accordingly, one subject of the present invention to provide a new class of disperse and soluble dyes for synthetic fibers which overcome or otherwise mitigate problems of the prior art in this area.

A still further object of the invention is to provide a new class of azo dyestuffs which are excellent for dyeing synthetic fibers and, in particular, provide advantages with respect to fastness to sublimation.

A still further object of the invention is to provide a new class of azo dyestuffs which are derived from the coupling of alpha-methyleneglutaronitrile derivatives to diazos as well as processes for the preparation of the novel dispersed dyes and methods for their use in the disperse dyeing of synthetic fibers.

Other objects and advantages of the present invention will become apparent as the description thereof proceeds.

In satisfaction of the foregoing objects and advantages, there is provided by the subject invention a new class of disperse dyes for synthetic fibers which have excellent sublimation fastness properties, and may be characterized by the following general formula:

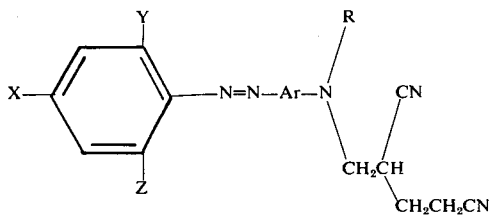

wherein X is a negative group, such as NO$_2$, lower alkyl sulfonyl, CN, CF$_3$, lower carboalkoxy, sulfonamide, mono- and di-lower alkyl sulfonamide, carboxamide, or mono- and di-lower alkyl carboxamide, carbonyl- and sulfonyl-morpholide or piperidide; Y is H, Cl, Br, F or the same as X; Z is H, Cl, Br, F, CN, CF$_3$ or lower carbalkoxy; Ar is an aryl radical attached to the nitrogen of the azo group at the position para to the amine substituent and R is hydrogen, and alkyl radical or a substituted alkyl radical, all as defined more specifically hereinafter.

In the above formula, when R is amino substituted, there are also provided the water-soluble quaternary ammonium derivatives, particularly suitable for dyeing polyacrylonitriles, as well as the corresponding cyclic amides and imides. Also provided are methods for the production of these novel dyestuffs and their use in the dyeing of synthetic fibers.

DESCRIPTION OF PREFERRED EMBODIMENTS

The novel dyestuffs of the present invention are particularly useful as disperse dyes for synthetic fibers and particularly synthetic fibers such as polyesters, silk, acetates, triacetates, nylons, polyolefins and polyesters, as well as water soluble dyes for polyacrylonitrile fibers. When applied to synthetic fibers, these dyestuffs have been found to have excellent fastness to light and sublimation. In this regard, fastness to sublimation is particularly important when a dyestuff is applied by the thermosol method of dyeing. By this method the fiber treated with dyestuff is exposed to intense heat for a short time, and the dyestuff sublimes, so that the dyeing is affected in strength and brightness and the equipment in surrounding areas becomes contaminated with dye. The products of the present invention overcome these disadvantages of the prior art products and provide superior sublimation fastness, over similar dyes known in the art.

The dyestuffs of this invention may be produced in the conventional manner utilizing known methods for effecting the formation of diazo compounds and the resulting coupling reactions. In the process, an amine of the following formula:

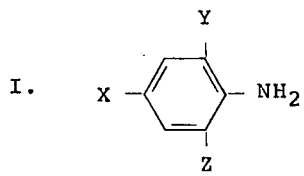

in which X, Y and Z have the meanings described above, is diazotized and coupled with a compound having the formula:

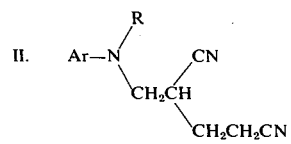

wherein Ar is an aryl radical devoid of substituents in the position para to the amino group and thus is capable of coupling in the position para to the amine substituent to the nitrogen of the diazo, and R is hydrogen, an alkyl radical or a substituted alkyl radical. As pointed out above, when the R substituent contains an amino radical there are also provided the water soluble quaternary ammonium salts of these compounds as well as the corresponding cyclic amides and imides.

The diazotization and coupling reactions may be carried out in a known manner, for example, as shown in U.S. Pat. No. 2,099,525 or 3,079,377, by reacting the amine of Formula I with nitrosyl sulfuric acid at a temperature of about 0°–30°C. or sodium nitrite in aqueous mineral acid such as sulfuric acid or hydrochloric acid at a temperature of about 0°–20°C. The excess nitrite may be later removed by treatment with sulfamic acid. The resulting diazotized amine is then coupled with an equivalent amount or up to equivalent excess of 10 percent by weight of either reactant with the amine of Formula II by forming a solution of the latter in dilute aqueous mineral acid at a temperature of 0°–15°C. and adding to the diazo solution portionwise over a period of time at a temperature of about 0°–15°C. When nitrosyl sulfuric acid is used or a large excess of other mineral acid, this can be carefully neutralized after dilution of the combination with ice and $H_2O$ by addition of sodium acetate, $Na_2CO_3$ or NaOH. Usually complete coupling is attained well before a pH of 4–5 is reached. In this reaction, if the coupler amine is basic enough, it can be dissolved in dilute aqueous mineral acid (e.g. HCl or $H_2SO_4$), containing a small amount of sulfamic acid (which destroys the excess nitrous acid and which may be left in the diazo used), and the diazo run into the coupling reaction.

The following is a listing of representative starting materials for use in preparing the products of the invention.

I. The initial amine of Formula I to be diazotized and coupled may be exemplified by the following compounds:
para-nitroaniline
2-chloro-4-nitroaniline
2-bromo-4-nitroaniline
2,6-dichloro-4-nitroaniline
2,4-dinitro-6-chloroaniline
2,4-dinitro-6-bromoaniline
para-aminobenzoic acid, ethyl ester
para-trifluoromethylaniline
2-trifluoromethyl-4-nitroaniline
para-methylsulfonylaniline
para-cyanoaniline
sulfanilamide
sulfanilanilide
N,N-dimethylsulfanilamide
para-aminobenzenesulfonomorpholide
para-amino-N,N-dimethylbenzamide
2,6-dibromo-4-nitroaniline
2-fluoro-4-nitroaniline
2-cyano-4-nitroaniline The coupling components of Formula II comprise novel intermediate derivatives of alpha-glutaronitrile.

In general, these dyestuff coupler intermediates are of the general formula:

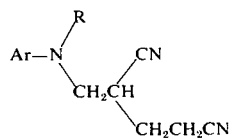

wherein Ar is a substituted or unsubstituted aryl radical but devoid of substituents in the position para to the amino group to permit coupling, and R is hydrogen, an alkyl radical or a substituted alkyl radical. When R is amino substituted there are also provided the corresponding quaternary ammonium salts and cyclic amides and imides. More particularly, in the above formula Ar is naphthyl or an aryl radical of the following formula:

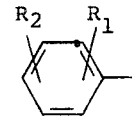

wherein in the above formula, $R_1$ and $R_2$ are hydrogen, alkyl of 1 to 7 carbons, alkoxy of 1 to 7 carbons, halogen, trifluoromethyl, acetamido, benzamido, alkoxycarbonyl, i.e., $R_3OCO-$ where $R_3$ is alkyl of 1 to 7 carbons or phenyl and the like. It is necessary however, that the position on the ring para to the amino group be devoid of any of these substituents so that it can couple in that position to the diazo in the coupling reaction of this invention.

A highly preferred Ar radical is of the formula:

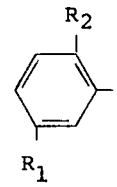

wherein $R_1$ is H, Cl, $CH_3$ or $R_3CONH-$, and $R_2$ is H, $CH_3$, lower alkoxy of 1 to 4 carbon atoms and $R_3$ is as described above.

The substituent R in the formula above is defined as hydrogen, an alkyl radical or a substituted alkyl radical. More particularly, it is preferred that R be hydrogen, an alkyl radical of 1–20 carbon atoms, a haloalkyl or dihaloalkyl radical of 1–4 carbon atoms, cyanoalkyl where the alkyl group has 1–3 carbon atoms, amino alkyl or diaminoalkyl of 1–4 carbon atoms, the quaternary ammonium, cyclic amide and imide derivatives thereof, hydroxyalkyl or dihydroxyalkyl of 1–4 carbon atoms, epoxyalkyl of 1–4 carbon atoms, halohydroxyalkyl of 1–4 carbon atoms, sulfatoalkyl of 1–4 carbon atoms, cyanohydroxyalkyl of 1–4 carbon atoms, alkoxyalkyl of 1–10 carbon atoms, carboalkoxyalkyl of 1–10 carbon atoms, carboxyalkyl esters of 1–10 carbon atoms or carboxyalkyl amides of 1–10 carbon atoms. Highly preferred substituents for R are as follows:
methyl
ethyl
propyl
isopropyl
butyl
isobutyl
tert-butyl
amyl
hexyl
octyl
dodecyl
octadecyl
2-chloroethyl
2-chloropropyl
3-chloropropyl
4-chlorobutyl
2-bromoethyl
2,3-dichloropropyl 2-aminoethyl
trimethylammoniumethyl
pyridinium ethyl
succimidoethyl
2-cyanoethyl
2-hydroxyethyl
2-hydroxypropyl
3-hydroxypropyl
2,3-dihydroxypropyl
2,3-epoxypropyl
3-chloro-2-hydroxypropyl
3-bromo-2-hydroxypropyl
2-sulfatoethyl
3-cyano-2-hydroxypropyl
2-lower alkoxyethyl
3-lower alkoxypropyl
2-carbomethoxyethyl
2-carboethoxyethyl
2-carbobutoxyethyl
3-carbomethoxypropyl
carboxymethyl, methyl ester
carboxymethyl, ethyl ester
carboxymethyl, butyl ester
2-carboxyethyl, ethyl ester
carboxymethyl, dimethylamide The couplers employed in this invention are produced by the reaction of alpha-methyleneglutaronitrile of the formula:

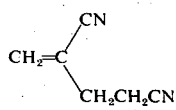

with at least an equivalent amount of an aryl amine of the following formula:

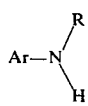

wherein Ar and R have the values ascribed above. Preferred arylamines for use in the reaction are as follows:
aniline
o- and m-toluidine
o- and m-anisidine
o- and m-phenetidine
o- and m-chloroaniline
o- and m-bromoaniline
o- and m-fluoroaniline
o- and m-trifluoromethylaniline
m-acetamidoaniline
m-benzoylamidoaniline
m-carboalkoxyaniline
6-methyl-m-anisidine
5-methyl-o-anisidine
6-methyl-m-acetamidoaniline
6-methoxy-m-acetamidoaniline
2,5-dimethoxyaniline
2,5-dichloroaniline
1-naphthylamine The alpha-methyleneglutaronitrile and aryl amine may be generally reacted in equivalent amounts, that is, on a mole to mole basis to obtain the products. The reaction is preferably carried out by contacting the reactants in the presence of a small amount of a metal salt catalyst and heating at a temperature of about 75°C. to the reflux point of the reaction for from 10 hours to 5 days. A solvent inert to the reactants may be used in the reaction, for example, from about 0.5 to about 5 moles of an inert solvent such as dioxane, methyl pyrrolidone, dimethylformamide, alkyl ethers, carbon tetrachloride, aromatic hydrocarbons including benzene, toluene and xylene, halogenated hydrocarbons such as chlorobenzene and the like may be used. It is highly preferred however to use as the solvent an excess of up to 5 moles of the amine reactant per mole of the alpha-methyleneglutaronitrile as excellent results are obtained thereby. As pointed out, the presence of catalytic amounts of any of the usual condensation catalysts also favorably influence the reaction. Preferred catalysts which may be used include cupric acetate, cuprous chloride, acetic acid and the like, all of which are well known in the art.

In practicing the reaction, the aryl amine, solvent or excess amine, catalyst and alpha-methyleneglutaronitrile are combined in the appropriate amounts and the reaction mixture heated to reflux until the reaction is complete. The reaction may also be carried out in an autoclave under pressure wherein the time required for the reaction will be correspondingly reduced.

After completion of the reaction it is preferred to distill off the excess amine or solvent although in some cases this may not be necessary. The product is then isolated in the usual manner of isolating solid products of this general type. One effective method is to drown the reaction mass in very cold water, keeping it chilled until crystallization occurs and then filtering. If desired the product may then be washed with cold water and dried.

While the above is one procedure for conducting the process, in practice it has been found preferable to initially react the alpha-methyleneglutaronitrile with approximately an equivalent amount of a primary amine of the formula:

wherein Ar is as described above, rather than the secondary amine, as it is difficult to react alpha-methyleneglutaronitrile with the above described secondary amines because of steric hindrance. In this procedure then, the reaction described with the alpha-methylene glutaronitrile is conducted and then the R substituent is attached to the nitrogen of the amine. For example, it has been found that the thus formed secondary amine can be alkylated to provide the R substituent in known manner.

If the reaction is conducted under such conditions that alkylation is desirable, that is, alkylation is desirable after reacting a primary amine with alpha-methylene glutaronitrile, alkylation may then be carried out for example by charging the required molar amount of the amine into an excess of an inert solvent such as aliphatic alcohol or aqueous alcohol solution and an equivalent amount, preferably an excess, of the sulfate of the group to be introduced. Catalysts and other materials may be added as desired and known in the art. The reaction mixture is then heated, preferably at the reflux point of the system. Any solids are then filtered off, the solvent is removed by distillation and the solution cooled to provide the solid or semi-solid product. In cases where a halogenated substituent or halosubstituted group is desired, heating the hydroxyethyl product with an excess of a halogenating agent, e.g., thionyl chloride, until hydrogen halide evolution ceases will produce products of this type.

In these products where R is a halogenated radical, such as a haloalkyl radical, it is also preferred and within the scope of this invention that such compounds be further reacted with a tertiary amine to form preferably tertiary or quaternary ammonium derivatives thereof. These quaternary ammonium salts form a valuable embodiment of the invention since they form dyestuffs which are water-soluble and therefore excellent basic dyes for polyacrylonitrile fibers.

To accomplish this, the N-haloalkylarylamine, prior to or after distilling off the solvent, is treated with a tertiary amine. The reaction is warmed usually to or near the reflux and held there for 30 minutes to about 24 hours. The intermediate can be isolated by evaporating to dryness. However, it is preferably to use it as a coupler without isolation to form the dyestuffs. In this reaction, the tertiary amine may be of the following formula:

$$N(R_4)_3$$

wherein $R_4$ is alkyl of 1 to 5 carbons, aralkyl of 7 to 14 carbon atoms or together with the nitrogen atom, a heterocyclic radical. Preferred amines for use in the reaction are as follows:

trimethylamine
triethylamine
tributylamine
pyridine, picoline, lutidines and other substituted pyridines
morpholine
quinoline These final product quaternary ammonium derivatives, after coupling, may be described by the following general formula:

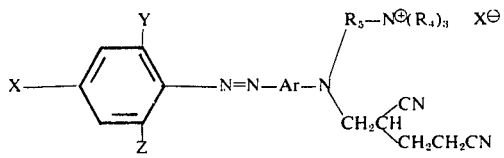

wherein Ar and X, Y and Z are as defined above, $R_5$ is a straight or branch chained alkylene group of 1 to 7 carbon atoms, $R_4$ is as above and $X^-$ is the cation of a mineral acid, such as HCl, HNO$_3$, H$_2$SO$_4$, etc. In this formula $R_5$ is preferably —CH$_2$—, —CH$_2$CH$_2$—, —C(CH$_3$)$_2$, —CH$_2$CH$_2$CH$_2$— and $X^\ominus$ is Cl$^\ominus$ or Br$^\ominus$. Highly preferred compounds within this group are those wherein $R_5$ is as indicated and

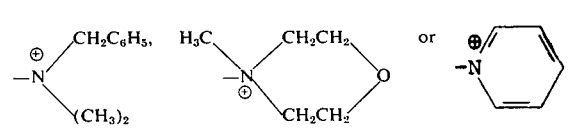

Various other subsequent reactions may be carried out on the products of the invention to provide a wide variety of new compounds. For example, when the R substituent is a primary alkyl halide, Delepine's reaction with hexamethylene tetramine may be carried out to form the hexaminium halide which may then be hydrolyzed to the amine with aqueous mineral acid.

With respect to subsequent reactions carried out on the intermediates, there may be mentioned the dye intermediates containing cyclic amides and imides. The dyes from these intermediates form particularly colorfast dyes for hydrophobic fibers. These compounds are prepared from the intermediates when R is an amino substituted group, preferably aminoalkyl such as aminoethyl as described above. These novel products, after coupling, may be described by the following general formula:

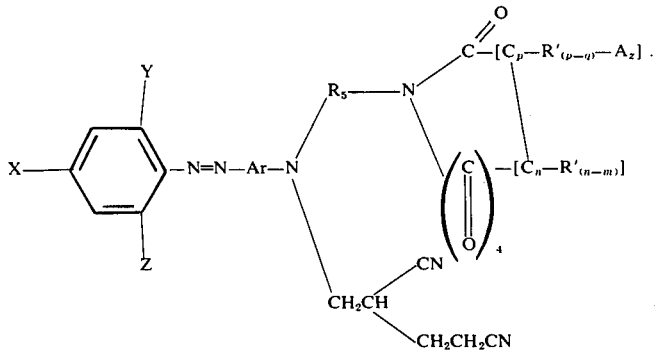

wherein X, Y, Z, Ar and $R_5$ are as defined above and wherein the R's are independently selected from hydrogen, halogen, hydroxy, alkyl, substituted alkyl (e.g., chloroalkyl, bromoalkyl, hydroxyalkyl, alkoxyalkyl, cyanoalkyl, carbalkoxyalkyl, and the like), aryl substituted aryl (e.g., phenyl, tolyl, xylyl, alkoxyphenyl, chlorophenyl, carbalkoxyphenyl, sulfamidophenyl, carboxamidophenyl, alkylsulfonylphenyl, alkylaminophenyl, and the like), cycloalkyl and the like;

A is selected from oxygen, nitrogen or sulfur;
$n$ and $p$ are integers having values from 0 to 15;
$n + p$ has a value of at least 2;
$z$ is an integer having a value of 0 or 1;

$r$ is an integer having a value of 0 or 1;

$n + p + z + r$ have a value of at least 3;

$m$ and $q$ are the number of double bonds in the $C_n$ and $C_p$ moieties;

in the case where $r$ is 1, $z$ is 0, and $n$ and $p$ are each 1, one R' of each carbon atom may jointly form a 6-membered aryl ring.

Quaternary derivatives of the above defined dyes are also encompassed within the scope of the present invention.

Alternatively, these novel dyestuff products can be represented by the following formula:

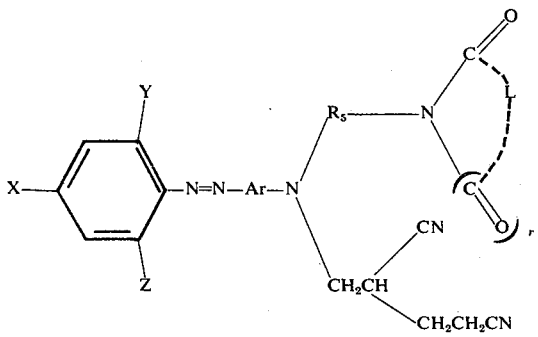

wherein X, Y, Z, Ar, $R_5$ and $r$ are as defined above. The radical

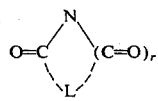

represents the nucleus of a cyclic amide or imide, preferably a five or six membered cyclic amide or imide, and L represents an organic radical containing from 0 to 1 hetero atoms selected from oxygen, sulfur and nitrogen and being selected from substituted or unsubstituted, saturated and unsaturated radicals. The radical L can be substituted by the groups represented by R' as described and may contain unsaturation as represented by $m$ and $q$ above.

Additionally, the above dyes can be in the form of their quaternary salt.

These coupling components may be prepared in any conventional and convenient manner. However, it has been found that a convenient method of preparing the lactam compounds is by autoclaving the appropriate amine with an approximately equivalent amount of the desired lactone. The temperature, pressure and time of the autoclaving can vary considerably, a temperature of about 200°–400°C., a pressure of about 150–400 lbs., and a time from about 5 to 10 hours being preferred.

Specific lactones which may be used as reactants for producing the lactam substituent include the following:

butyrolactone and the following substituted butyrolactones:
3-methyl
4-methyl
5-methyl
3-ethyl
4-ethyl
5-ethyl
3,3-dimethyl
4,4-dimethyl
5,5-dimethyl valerolactone and the following substituted valerolactones:
3-methyl
4-methyl
5-methyl
6-methyl
γ-valerolactone
γ-chloro-γ-methylbutyrolactone
γ-chloromethylbutyrolactone
α-bromo-γ-chloromethylbutyrolactone
δ-caprolactone
γ-caprolactone
3-ethylbutyrolactone
5,5-dimethylbutyrolactone
4,5-dimethylbutyrolactone
4-bromo-3,3-dimethylbutyrolactone
5-ethyl-5-methylbutyrolactone
3,3,4-trimethylbutyrolactone
5-amylbutyrolactone While the above represents a rather broad class of compounds of this type, a highly preferred class comprises compounds of the formula:

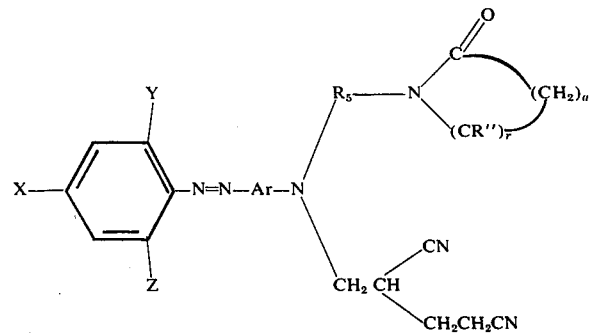

wherein X, Y, Z, Ar and $R_5$ are as above, R" is =O or $H_2$, $r$ is 0 or 1, and $a$ is an integer of 1 to 12, together with condensed aryl rings attached to adjacent carbon atoms of the ring. Preferred compounds of this class are those wherein the amide moiety is of the formulae:

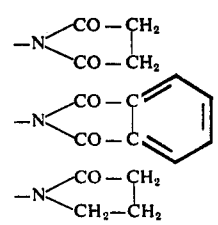

In preparing these compounds, the amides are prepared from the corresponding lactones as described above. However, in preparing the imides, a preferred procedure is to react the amine with a dibasic acid anhydride including the anhydrides of succinic acid, glutaric acid, adipic acid, pimelic acid, suberic acid, azelaic acid, sebacic acid and brassylic acid as well as the lower alkyl substituted derivatives thereof and these anhydrides which have benzene rings attached to adjacent carbon atoms on the ring, e.g. phthalic anhydride.

This reaction is conducted by contacting the amine and anhydride in molar ratios and heating gradually until an exothermic reaction is initiated. After the temperature begins to fall, it is then heated at a temperature of 125°–150°C. for 1 to 2 hours, cooled below 100°C. and drowned into an excess of ice water containing a base. The product is then filtered off and dried.

The products resulting from this reaction, after coupling as described, are imide derivatives of the formula:

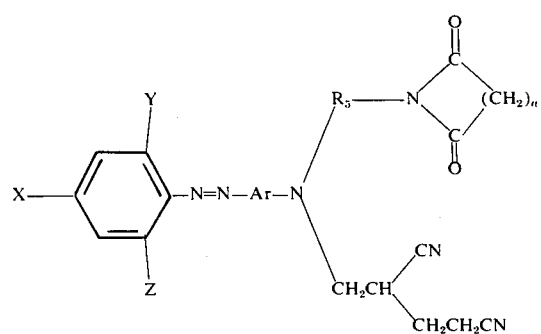

wherein X, Y, Z, Ar, $R_5$ and a are as defined above, together with these compounds which have benzene rings condensed at adjacent carbon atoms on the imide ring.

The dye is usually recovered as a powder and can be treated with dispersing agents in the same manner employed in the preparation of dispersed acetate dye pastes to obtain a dispersible dye. Alternatively, a 40–50 percent active dispersed powder can be employed in a similar manner but in lesser amounts.

Dispersing agents such as sodium lignosulfonate and alkylarylsulphonates and the products resulting from the condensation of sulphonated aromatic derivatives with aldehydes, such as the methylene-dinaphthylsulphonates, are particularly valuable auxiliary substances since they allow the preparation of a good dispersion of the dyestuffs and facilitate the taking up of the latter on the fibers. On the other hand, "carriers", such as mono- or poly-chlorinated derivatives of the benzene series or diphenyl, can be added to the dye bath or to the printing pastes. These substances exert a swelling action on the fibers and are capable of improving the tinctorial yield.

In carrying out the dyeing procedure of the present invention 20 weight percent active dispersed paste of the dyestuff is dissolved in water at concentrations of from about 1.0 to 15.0 ounces per gallon. The solution is thickened to suitable padding consistency by the addition of conventional thickeners such as gum tragacanth in quantities normally about twice that of the water employed.

The dyeing method of the invention comprises essentially impregnating the polyester fiber by padding or printing with an aqueous suspension or solution of the dye corresponding to Formula I above at a temperature of about 140°F. to 180°F., drying the impregnated fiber and subsequently subjecting said impregnated fiber to a heat treatment at a temperature of from about 390°F. to about 440°F. for a period of time sufficient to develop the full color.

The following examples illustrate the invention but are not intended to be limitative thereto. In the examples and throughout the specification, parts are by weight unless otherwise indicated.

EXAMPLE 1

44.5 Grams of N-(2,4-dicyanobutyl)-m-toluidine are dissolved in 325 cc. of concentrated hydrochloric acid and 175 cc. of water. It is then clarified to remove traces of insoluble material. A solution of 0.21 mole of p-nitroaniline diazo (prepared in usual manner) is run into the coupler solution at a temperature below 10°C. and water is added to a total volume of 3000 cc. The charge is stirred for 2 hours. The orange dye is filtered, washed with cold water and dried. It has the formula:

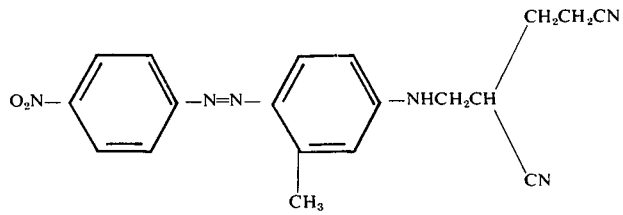

Then 8.0 grams of this dyestuff are dispersed by viscous milling in a Werner Pfleiderer mixer for 3 hours with 11 grams of Marasperse CB (a sulfonated sodium lignosulfonate, sold by Marathon Products), 0.5 gram of Nekal BX-78, sodium alkylnaphthalenesulfonate (GAF), 0.5 gram of Nekal WS-25 (GAF) and 0.2 gram of sodium carbonate and then dried to a powder.

Thereafter 2 ounces of this dyestuff are dispersed in 83 cc. of warm water and the resultant solution diluted up to a gallon with water. Polyester fabric (Dacron 54) is padded with this solution in strengths of 1 and 6 percent o.w.f., is dried and cured at about 220°C. for 90 seconds. The dyed material is then soaped at the boil for 5 minutes, washed and dried. In both cases, bright solid orange shades are obtained having excellent build-up, sublimation and light fastness.

Dacron 54 is also carrier dyed using Dowicide A as carrier in usual manner in strengths of 1.3 and 5%, based on the weight of the fiber. Good build-up and bright solid orange dyeings are obtained.

EXAMPLE 2

Example 1 is repeated with the exception that the p-nitroaniline diazo is replaced by 0.21 mole of 2-chloro-4-nitroaniline diazo to prepare a brownish-red dye which has the formula:

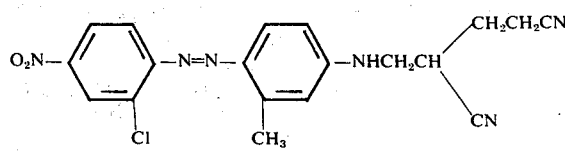

A dispersed powder of this dye is prepared and thermosol dyeings were made in 1 and 6 percent strengths based on the weight of the fiber in the manner of Example 1. Sublimation is absent in the 1 percent dyeing when the dyeing is subjected to 375°F. for 60 seconds in contact with pieces of Dacron and cotton in an Atlas Scortchtester and only the slightest trace in the 6 percent dyeing. The reddish-brown dyeings show excellent build-up and light fastness. The dyestuff dyes with good build-up when carrier dyed at 1.3 and 5 percent based on the weight of the fiber. There is practically no stain on adjacent cotton and acetate fibers.

EXAMPLE 3

Example 1 is repeated with the exception that the p-nitroaniline diazo is replaced by 0.21 mole of 2.6-dichloro-4-nitroaniline diazo made by the nitrosylsulfuric acid method. The dyestuff has the formula:

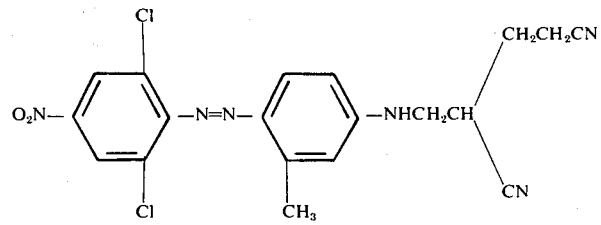

When dispersed and used to dye Dacron fabric, a yellowish-brown shade is obtained. Thermosol dyeing at 1 and 6% strengths, based on the weight of the fiber indicates practically perfect sublimation fastness. 1.3 and 5 percent carrier dyeings show good build-up with no stain on adjacent cotton and acetate fibers.

EXAMPLE 4

Example 1 is repeated with the exception that the p-nitroaniline diazo is replaced by 0.21 mole of 6-chloro-2,4-dinitroaniline diazo, and the coupler of Example 1 is replaced by 0.2 mole of 5-acetamido-N-(2,4-dicyanobutyl)-2-ethoxy-N-ethylaniline. The dyestuff has the formula:

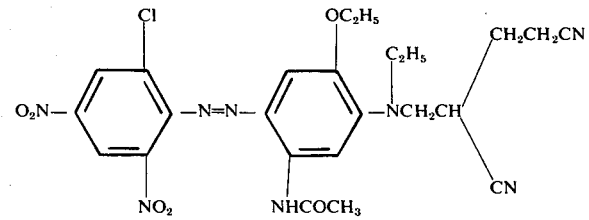

The blue dyestuff dyes polyester fiber a violet shade having excellent sublimation and light fastness with excellent build-up.

The following dyes are produced in like manner.

| Ex. | Diazo Base | Coupler | Color |
| --- | --- | --- | --- |
| 5 | 2-Chloro-4-nitro-aniline | 3-Acetamido-N-(2,4-dicyanobutyl)aniline | Scarlet |
| 6 | p-Aminobenzoic acid, ethyl ester | N-(2,4-Dicyanobutyl)-N-ethylaniline | Orange |
| 7 | p-Trifluoromethyl-aniline | N-(3-Chloro-2-hydroxy-propyl)-N-(2,4-dicyanobutyl)-aniline | Orange |
| 8 | p-Methylsulfonyl-aniline | N-(2-Chloroethyl)-N-(2,4-dicyanobutyl)-3-methylaniline | Reddish-orange |
| 9 | p-Cyanoaniline | N-(2,4-Dicyanobutyl)-m-toluidine | Orange-scarlet |
| 10 | Sulfanilamide | N-(2,4-Dicyanobutyl)-m-toluidine | Reddish-orange |
| 11 | N,N-Dimethylsul-fanilamide | N-(2,4-Dicyanobutyl)-m-toluidine | Reddish-orange |
| 12 | p-Aminobenzenesul-fono morpholide | N-(2,4-Dicyanobutyl)-m-toluidine | Orange-scarlet |
| 13 | p-Amino-N,N-dimethyl-benzamide | N-(2,4-Dicyanobutyl)-m-toluidine | Orange |
| 14 | 2,6-Dibromo-4-nitroaniline | N-(2,4-Dicyanobutyl)-m-toluidine | Brown |
| 15 | 2-Fluoro-4-nitro-aniline | N-(2,4-Dicyanobutyl)-m-toluidine | Brownish-red |

-continued

| Ex. | Diazo Base | Coupler | Color |
| --- | --- | --- | --- |
| 16 | p-Nitroaniline | 3-Chloro-N-(2,4-di cyanobutyl)aniline | Reddish-orange |
| 17 | p-Nitroaniline | 3-Bromo-N-(2,4-di-cyanobutyl)aniline | Reddish-orange |
| 18 | p-Nitroaniline | 3-Fluoro-N-(2,4-di-cyanobutyl)aniline | Orange |
| 19 | p-Nitroaniline | N-(2,4-Dicyanobutyl)-N-[2-(succinimidoethyl)]aniline | Orange |
| 20 | p-Nitroaniline | N-(2,4-Dicyanobutyl)-N-[2-(pyrrolidon-1-ylethyl)]aniline | Orange |

EXAMPLE 20

26.2 Grams of N-(2-chloroethyl)-N-(2,4-dicyanobutyl)-aniline (0.1 mole) are refluxed with a 40 percent aqueous trimethylamine solution (0.15 mole trimethylamine) until the reaction product is soluble in water. The resulting solution is boiled until free of the excess trimethylamine and is then acidified to pH 4 with hydrochloric acid. Approximately 0.1 mole of p-nitroaniline diazo is run into the cold aqueous solution of coupling component. The product is then precipitated by gradual addition of a mixture of zinc chloride and sodium chloride, is filtered and dried. The product is an orange dye especially useful in dyeing polyacrylic fibers. It has the structure:

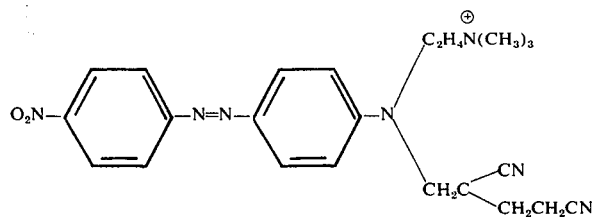

EXAMPLE 21

21.3 Grams of the product of Example 1 (0.1 mole), 16 grams of ethylene chlorohydrin, 20 grams of precipitated chalk, 150 cc. isopropanol, and 50 cc. $H_2O$ are refluxed for 48 hours. The dissolved calcium is precipitated as $CaSO_4$, the resulting reaction mass filtered from the $CaSO_4$, the isopropanol distilled off from the filtrate, the aqueous solution cooled in an ice bath and the product filtered off and dried in a 50°C. vacuum oven.

The resulting N-hydroxyethyl-N-dicyanobutyl compound is then refluxed with excess thionyl chloride until no further evolution of HCl occurs and the excess thionyl chloride is distilled off.

The resulting N-chloroethyl-N-dicyanobutyl compound is reacted according to Delepine's method by heating with hexamethylene tetramine to form the hexaminium chloride and then hydrolyzed by heating with ethanol and concentrated HCl to the HCl salt of the N-aminoethyl-N-dicyanobutyl derivative. The amine is set free by neutralizing with sodium carbonate, filtered off cold and allowed to air dry. 27.6 Grams (0.1 mole) of the aminoethyl compound and 10 grams (0.1 mole) of succinic anhydride are mixed intimately and heated gradually until an exothermic reaction begins. After the temperature begins to fall, it is heated to 135°–140°C. for one hour. The melt is then cooled below 100°c. and drowned into 2 liters of ice and water containing 10 grams $Na_2CO_3$. The product is filtered off and washed with water and dried.

Example 1 is repeated with the exception that the p-nitroaniline diazo is replaced by 0.21 mole of 2,6-dichloro-4-nitro-aniline diazo made by the nitrosylsulfuric acid method and the N-(2,4-dicyanobutyl)-m-toluidine is replaced by approximately 0.2 mole of the above prepared coupler. A dyestuff is prepared which has the formula:

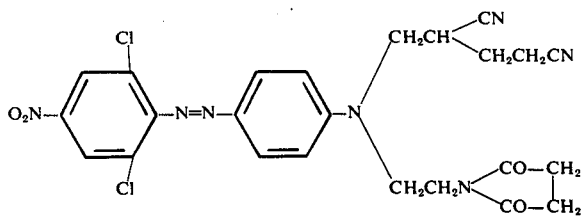

A brownish orange dye, especially useful for dyeing polyester fiber was obtained.

The invention has been described herein by reference to certain preferred embodiments. However, as obvious variations thereon will become apparent to those skilled in the art the invention is not to be considered as limited thereto.

What is claimed is:
1. A dyestuff of the following formula:

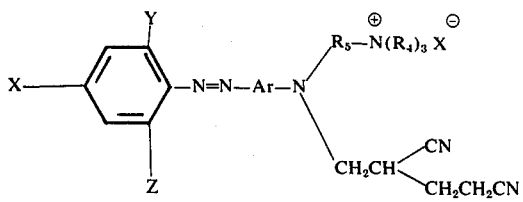

wherein
X is selected from the group consisting of $NO_2$, lower alkyl sulfonyl, CN, $CF_3$, lower carboalkoxy, sulfonamide, lower alkyl sulfonamide, di-lower alkyl sulfonamide, carboxamide, lower alkyl carboxamide and di-lower alkyl carboxamide;

Y is selected from the group consisting of H, Cl, Br and F or the same as X;

Z is selected from the group consisting of H, Cl, Br, F, CN, $CF_3$ and lower carbalkoxy;

Ar is bonded to the depicted diazo and adjacent N atom in para position and is selected from the group consisting of naphthyl and a radical of the formula:

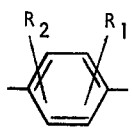

wherein
$R_1$ and $R_2$ are independently selected from the group consisting of hydrogen, alkyl of 1–7 C atoms, alkoxy of 1–7 C atoms, Cl, Br, F, $CF_3$, $R_3CONH-$ and $R_3OCO-$ wherein $R_3$ is selected from the group consisting of alkyl of 1–7 C atoms and phenyl;

$R_5$ is a straight or branch chain alkylene group of 1–7 C atoms;

$R_4$ is alkyl of 1–5 C atoms or aralkyl of 7–14 C atoms; and $X^-$ is the cation of a mineral acid.

2. A dyestuff according to claim 1 wherein $R_1$ and $R_2$ are independently hydrogen, methyl, methoxy, ethoxy, chloro, bromo, fluoro, $CF_3$, acetamido, benzoylamino or carboalkoxy.

3. A dyestuff according to claim 2 wherein $R_4$ is methyl, ethyl, propyl, or butyl and $R_5$ is $-CH_2-$, $-CH_2CH_2-$, $-CH_2CH_2CH_2-$, or $-C(CH_3)_2$.

4. A dyestuff according to claim 3 wherein $-N^+(R_4)_3$ represents $-N^{\oplus}(CH_3)_3$ or

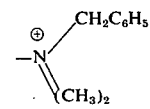

* * * * *

UNITED STATES PATENT OFFICE
CERTIFICATE OF CORRECTION

PATENT NO. : 3,926,945
DATED : December 16, 1975
INVENTOR(S) : Stiles M. Roberts, and Lester N. Stanley It is certified that error appears in the above-identified patent and that said Letters Patent are hereby corrected as shown below:

In Column 18, Line 12, the word "cation" should read ---anion---

Signed and Sealed this thirteenth Day of April 1976

[SEAL]

Attest:

RUTH C. MASON
Attesting Officer

C. MARSHALL DANN
Commissioner of Patents and Trademarks